United States Patent [19]

Hood et al.

[11] Patent Number: 4,747,126
[45] Date of Patent: May 24, 1988

[54] VOICE MAIL SYSTEM ON MAGNETIC TAPE

[75] Inventors: William G. Hood, Tigard; Thomas D. Klarquist, Beaverton; Kai-Dick Lee, Portland; Bruce C. Nepple, Portland; Daniel C. Olin, Portland; Lawrence B. Park, Aloha; Michael C. Park, Portland, all of Oreg.

[73] Assignee: A T & E Corporation, San Francisco, Calif.

[21] Appl. No.: 833,888

[22] Filed: Feb. 27, 1986

Related U.S. Application Data

[63] Continuation-in-part of Ser. No. 703,249, Feb. 20, 1985, abandoned.

[51] Int. Cl.$^4$ .............................................. H04M 1/65
[52] U.S. Cl. ....................................... 379/74; 379/73; 379/77
[58] Field of Search ........................ 379/70, 74, 77, 84, 379/88, 89, 73, 76

[56] References Cited

U.S. PATENT DOCUMENTS

| | | |
|---|---|---|
| 3,106,612 | 9/1957 | Lemelson . |
| 3,436,483 | 4/1969 | Blane ...................................... 379/77 |
| 3,488,443 | 1/1970 | Smith . |
| 3,530,260 | 9/1970 | Gaunt, Jr. . |
| 3,595,999 | 7/1971 | Cole . |
| 3,714,382 | 1/1973 | Sykes . |
| 3,728,487 | 4/1973 | Hata . |
| 3,804,993 | 4/1974 | Honnold et al. . |
| 3,812,532 | 5/1974 | Crosser et al. . |
| 3,858,006 | 12/1974 | Tomita . |
| 3,865,987 | 2/1975 | Yamamoto et al. . |
| 3,967,068 | 6/1976 | Shinohara . |
| 4,006,312 | 2/1977 | Rubenstein et al. . |
| 4,011,411 | 3/1977 | Nishimura . |
| 4,074,071 | 2/1978 | Shragal . |
| 4,122,306 | 10/1978 | Friedman et al. . |
| 4,124,773 | 11/1978 | Elkins . |
| 4,125,865 | 11/1978 | Mohammadioun . |
| 4,194,089 | 3/1980 | Hashimoto . |
| 4,198,544 | 4/1980 | Buglewicz . |
| 4,221,933 | 9/1980 | Lornell et al. ......................... 379/84 |
| 4,247,876 | 1/1981 | Bolick, Jr. . |
| 4,249,041 | 2/1981 | Smith, Jr. et al. . |
| 4,303,998 | 1/1981 | Plunkett, Jr. . |
| 4,312,021 | 1/1982 | Bolick, Jr. . |
| 4,319,290 | 3/1982 | Bolick, Jr. et al. . |

(List continued on next page.)

FOREIGN PATENT DOCUMENTS 2746613 5/1978 Fed. Rep. of Germany .

OTHER PUBLICATIONS

"Phone Mail Box", Brochure, Data Acquisition Services, Inc., San Marcos, CA.
"Multi-Line Disk System", Brochure, Data Acquisition Services, Inc., San Marcos, CA.
"Communicator", Brochure, Data Acquisition Services, San Marcos, CA.
"Q&A-1", Brochure, Data Acquisition Services, San Marcos, CA.

Primary Examiner—Raymond F. Cardillo
Assistant Examiner—James E. Tomassin
Attorney, Agent, or Firm—Klarquist, Sparkman, Campbell, Leigh & Whinston

[57] ABSTRACT

The present invention is a magnetic tape-based "voice mail" multi-user message system. The system transmits audio prompts to callers to help guide them through the various procedures. The callers respond with Touch-Tone commands. A novel circuit is provided to detect these tone commands without significant interference from the audio prompt signals. This circuit is highly insensitive to deviations in the impedance of the incoming telephone line from its expected value. A circuit is also provided to prevent Touch-Tone commands which are recorded on tape from being re-executed when they are played back from the tape. A single L.E.D. indicator on each recipient's telephone set indicates the status of the system: idle with new message waiting; idle without new message waiting; busy with new message waiting; or busy without new message waiting.

25 Claims, 6 Drawing Sheets

U.S. PATENT DOCUMENTS

| | | |
|---|---|---|
| 4,320,256 | 3/1982 | Freeman . |
| 4,327,251 | 4/1982 | Fomenko et al. . |
| 4,352,956 | 10/1982 | Gallet . |
| 4,357,493 | 11/1982 | Anderson et al. ............. 379/72 |
| 4,371,752 | 2/1983 | Matthews et al. . |
| 4,398,279 | 8/1983 | Titus, IV et al. . |
| 4,431,872 | 2/1984 | Edwards et al. ............. 379/77 |
| 4,473,854 | 9/1984 | Oishi et al. . |
| 4,517,410 | 5/1985 | Williams et al. . |
| 4,549,047 | 10/1985 | Brian et al. ............. 379/88 |
| 4,571,457 | 2/1986 | Hattori et al. . |
| 4,580,012 | 4/1986 | Matthews et al. . |
| 4,580,016 | 4/1986 | Williamson . |
| 4,581,486 | 4/1986 | Matthews et al. . |
| 4,582,957 | 4/1986 | Hayes et al. ............. 379/74 |
| 4,585,906 | 4/1986 | Matthews et al. . |
| 4,602,129 | 7/1986 | Matthews et al. . |
| 4,640,991 | 2/1987 | Matthews et al. . |
| 4,646,364 | 2/1987 | Emerson et al. ............. 379/89 |

VOICE MAIL SYSTEM ON MAGNETIC TAPE

This is a continuation-in-part application of copending application Ser. No. 703,249, filed on Feb. 20, 1985 and entitled "VOICE MAIL SYSTEM ON AUDIO TAPE", now abandoned.

BACKGROUND OF THE INVENTION

This invention relates to "voice mail" systems for recording and playing back audio messages for use by a plurality of users.

A "voice mail" system is a record and playback system that stores messages intended for one of a plurality of users. Substantially all presently known voice mail systems which can be used by more than a few users are digital, disk-based systems. An example of such a system is shown in U.S. Pat. No. 4,371,752 to Matthews, et al. In the Matthews, et al. system, a caller is greeted and instructed by prompt signals, to which the caller can respond by entering Touch-Tone commands. The caller can then record a message, review messages, or perform a number of other operations. Recorded messages are digitized and stored in a disk memory and are then associated with a recipient's mailbox address. To deliver the message, the system places periodic calls to the recipient using a private branch exchange (PBX) to which the system is connected. If the recipient answers such a call, the recipient is able, by entering tone commands, to review the message. Alternatively, the recipient can phone the voice mail system from a PBX or external line and inquire whether any messages are waiting.

The Matthews, et al. system is both complex and expensive. Its technique of calling recipients periodically to inform them of waiting messages makes it poorly suited for smaller, simpler installations in which a PBX line cannot be spared for such inefficient use. This technique also increases the overhead of such a system's central processing unit, further increasing cost.

Many voice mail systems use Touch Tone tones transmitted by a user for system control purposes. Such tones are typically decoded by a tone decoder. Sometimes non-tone signals, such as prompting messages sent by the system, can accidentally trigger the decoder and initiate an undesired operation. One prior art method for eliminating such undesired responses is to use a delay circuit that requires the tones to be detected for a relatively lengthy period, such as one second, before triggering a response. This method, of course, slows the system response.

Another problem associated with tone commands is that if a tone command is entered while a message is being recorded, the tone command will be recorded with the message. The recorded tone will then cause the command to be re-executed when the message is played back from tape. Solutions to this problem which involve filtering the tones from the tape record head input are ineffective due to the number and the wide frequency range of the component tones.

An article in EDN Magazine describes an approach for increasing the dynamic range of a low-speed, full duplex modem which transmits output signals at a first transmit frequency or tone and receives input signals at a second receive frequency or tone. The approach illustrated by this article presupposes that a filter is used to substantially remove the transmit tone from the receiver input. A hybrid interface is then used to further improve performance of the modem at the receive tone frequency. The hybrid interface includes differential amplifiers to help separate the transmitted output signals from the received input signals. (Peter Single, *Optimize the Hybrid Interface to Increase Modem Dynamic Range,* EDN, Oct. 18, 1984, pp. 279–285.)

This modem approach is ill-suited to voice mail applications. The Touch-Tone signals used in such applications extend over a broad frequency bandwidth, and thus a filter cannot satisfactorily be used to remove the unwanted prompt signals from the input of the tone decoder. Similarly, because the potentially interfering prompt signals extend over a broad bandwidth, the circuit of this article which separates transmitted from received tones cannot be optimized for a single frequency. Instead, it would have to be made to perform well throughout the full audio spectrum over which the interfering prompt signals might range.

SUMMARY OF THE INVENTION

It is an object of the present invention to provide an improved "voice mail" system and method.

It is also an object of the present invention to improve the performance of a voice mail system tone decoder.

It is a further object of the present invention to minimize the magnitude of outgoing prompt signals that are applied to the input of a voice mail system tone decoder.

It is still another object of the present invention to prevent Touch-Tone commands recorded in a voice mail system from being re-executed when the tones are played back from the system.

It is yet another object of the present invention to optimize performance of a voice mail system tone decoder over a wide range of telephone line impedances.

It is still another object of the present invention to indicate at each recipient's telephone station of a voice mail system whether a message is waiting for the recipient.

It is yet another object of the present invention to indicate at each recipient's telephone station of a voice mail system whether the system is in use.

The foregoing and additional objects, features and advantages of the present invention will be more readily apparent from the following detailed description of a preferred embodiment thereof, which proceeds with reference to the accompanying drawings.

DETAILED DESCRIPTION OF THE PREFERRED EMBODIMENT

Figure 1:
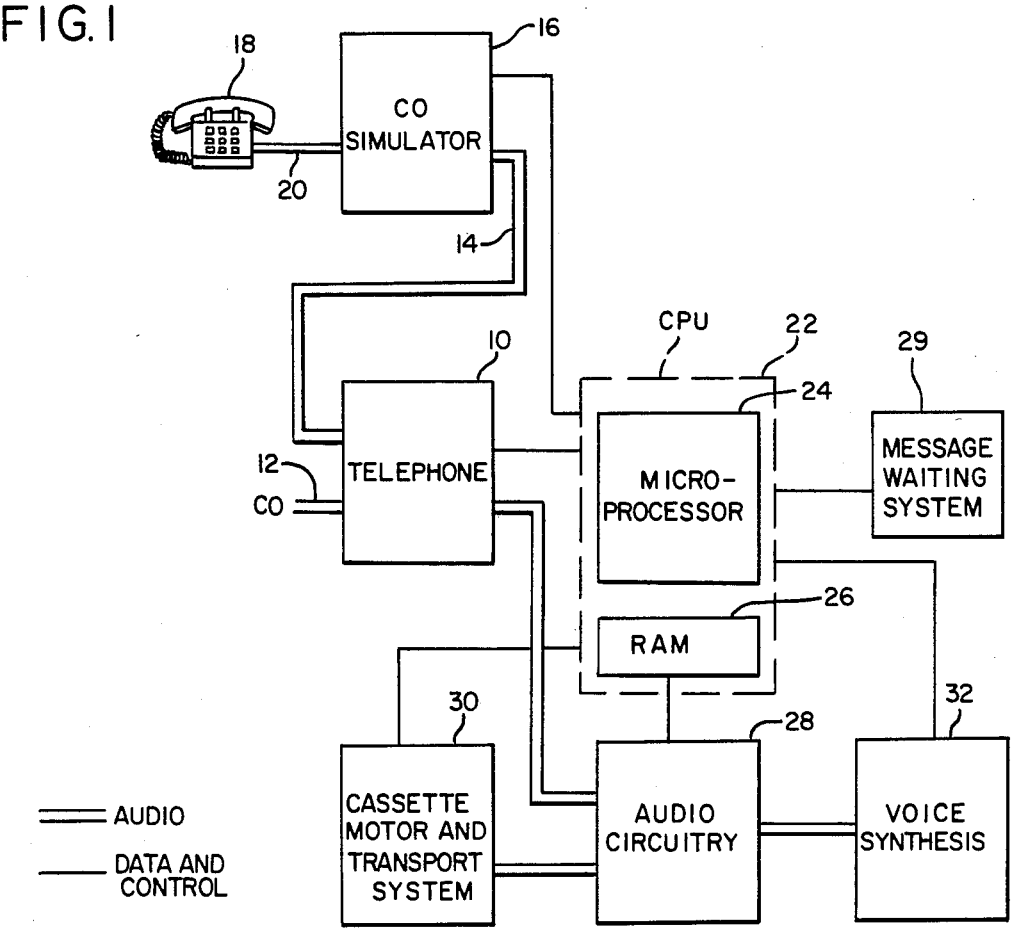
FIG. 1 is a block diagram of a preferred embodiment of a "voice mail" system in accordance with the present invention.

FIG. 1 shows a block diagram of one embodiment of the voice mail system of the present invention. Telephony circuit 10 interfaces with a telephone line to a central office (CO). Telephony circuit 10 is also coupled via a line 14 to a central office simulator 16. Simulator 16 provides an interface for local access via a telephone 18, or any device that employs a two wire trunk line 20. A CPU (central processing unit) 22 is coupled to simulator 16 and telephony circuit 10. CPU 22 contains a microprocessor 24 and a RAM (random access memory) 26. Audio circuitry 28, coupled to CPU 22 and telephony circuit 10, controls the recording on and playing back of a cassette tape. Message waiting system 29, coupled to CPU 22, indicates the status of the system to each subscriber. A cassette motor and transport system 30 controls the movement of the tape. A voice synthesis circuit 32 provides the system prompting messages.

Voice synthesis circuit 32 preferably contains digitized speech in a memory which is reconverted to analog signals when prompting messages are played. Alternately, a separate tape recorder may be used for storing and playing back the prompting messages.

The connection of telephony circuit 10 to CO simulator 16 and trunk line 20 is one illustrative method of providing access to the voice mail system. Alternately, for example, the voice mail system may be one extension of a PBX system.

Figure 2:
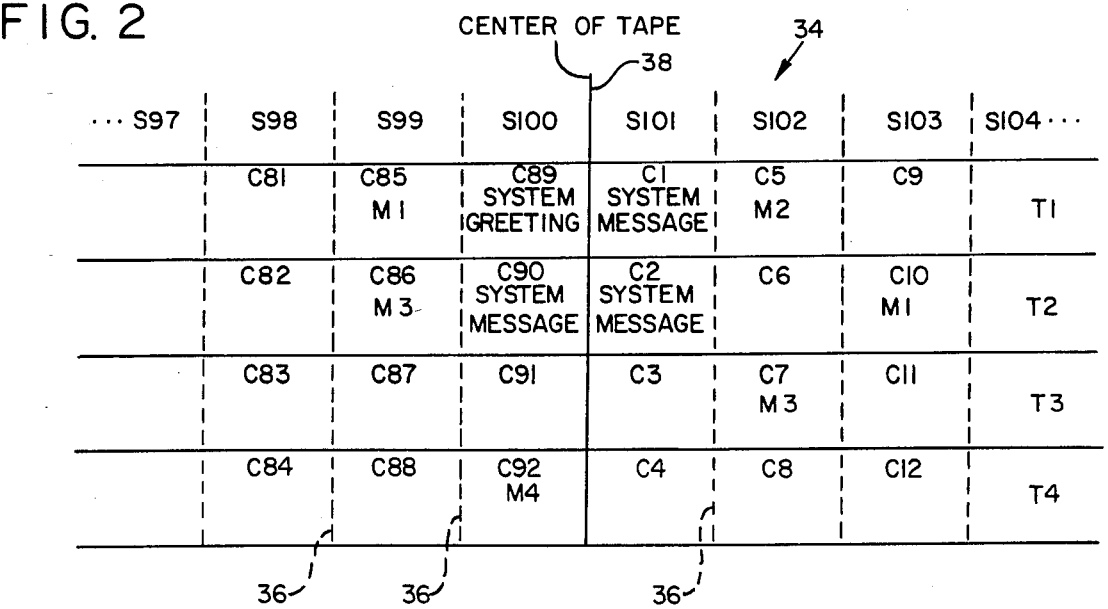
FIG. 2 is a schematic representation of the tape showing the message cells employed in the system of FIG. 1.

FIG. 2 shows a schematic representation of a magnetic tape 34 used by the voice mail system. Four tracks, T1–T4, of tape 34 are shown. Lines 36 indicate the boundaries of various segments of the tape. Segments S97–S104 are shown. A cell, the basic message unit of the tape, is defined by a track number and a segment number. It should be recognized, of course, that the track, segment and cell numbers are a function of the type and length of tape, and that those shown in FIG. 2 are for illustrative purposes only. Line 38 indicates the center of tape 34.

The addresses of certain cells are indicated by the "C" numbers at the top of each cell. Examples of the storage of messages for different mailboxes are shown by the "M" numbers representative of a mailbox in certain of the cells. For instance, cell C10 is designated with mailbox M1, as is cell C85. Referring to Table 1 below, which shows the association of cell messages with mailboxes in the system memory, one can see the above two cells are stored in conjunction with mailbox M1.

TABLE 1

| Mailbox Address | Cells (Track/Segment) |
| --- | --- |
| M1 | C10 (at T2, S103); C85 (at T1, S99) |
| M2 | C5 (at T1, S102) |
| M3 | C7 (at T3, S102); C6 (at T2, S99) |

Cells C89 and C1 contain a system greeting message and a system directory, respectively. Cells C90 and C2 contain other system messages. In operation, to record a message, the voice mail system selects the closest avilable cell to center 38.

After a boxholder reviews a message, he may indicate that the message should be deleted, which causes the reference to such cell under the mailbox in memory, as indicated in Table 1, to be deleted. Thus, that cell will be available for the recording of another message over the presently existing message.

The voice mail system can generate a system greeting, a system directory of mailbox numbers, individual mailbox greetings and prompting messages for users. The system greeting, system directory, and other messages are frequently played and are thus stored in the cells closest to center 38 of the tape 34. This central location provides quick access to these messages. Prompting messages are separately generated by a voice synthesizer 32, rather than being stored on tape 34. A separate voice synthesizer 32 is used because these messages need to be played while the system is simultaneously accessing a cell on tape 34. The system is thus able to access a cell while a prompting message is being played, thereby improving the perceived system response time.

Figure 3:
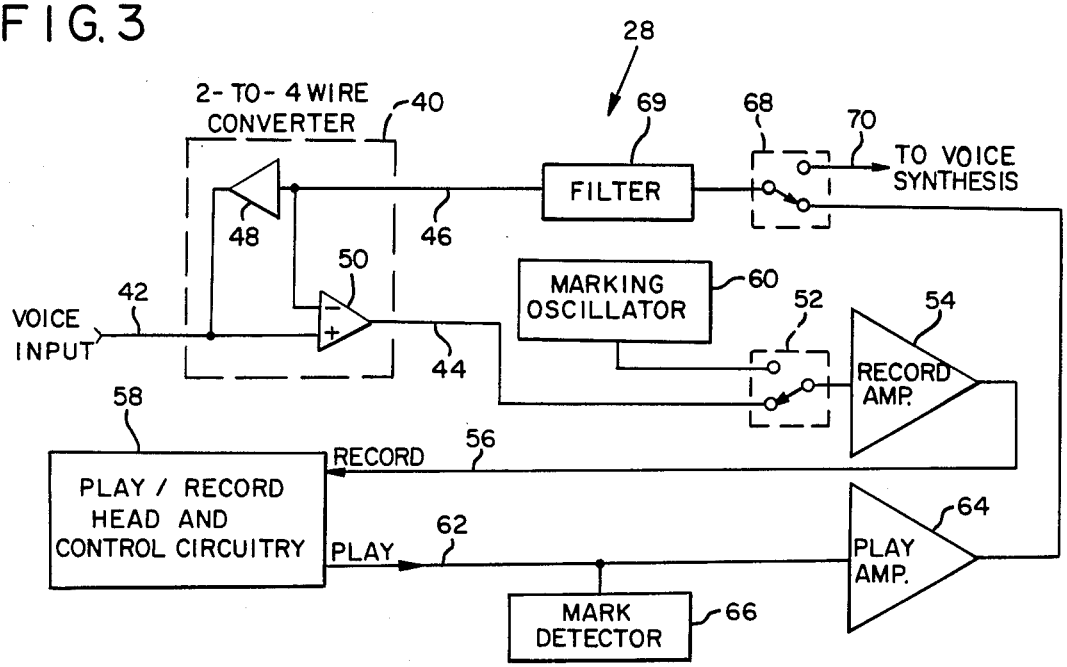
FIG. 3 is a block diagram of the audio circuitry of the system of FIG. 1.

The operation of the system of FIG. 1 is best understood by referring to the block diagram of the audio circuitry shown in FIG. 3. Audio circuit 28 processes the voice input through a 2-to-4 wire converter 40. A converter input line 46 and a converter output line 44 are coupled to one side of 2-to-4 wire converter 40. A two-wire telephone line input 42 is coupled to converter 40 and provides ingoing signals fed to line 44 to the remainder of audio circuit 28. The line 46 of audio circuit 28, with output signals, is coupled to telephone line 42 by converter 40. The output signals on line 46, which also are included with the input signals on telephone line 42, are subtracted from the input signals as explained below so that signals on line 44 only contain remotely originating-user input signals. This subtraction is illustrated graphically by an isolating amplifier 48, which couples line 46 to line 42, and a differential or subtracting amplifier 50. Line 46 is coupled to the inverting input of amplifier 50. The non-inverting input of amplifier 50 is connected to line 42. Therefore the output signals are subtracted from the combined output and user input signals on line 42. Thus, the output signals on line 46 which appear on telephone line 42, are removed from line 44, thereby enabling a user to input control signals while a message is being played by the voice mail system.

Figure 7:
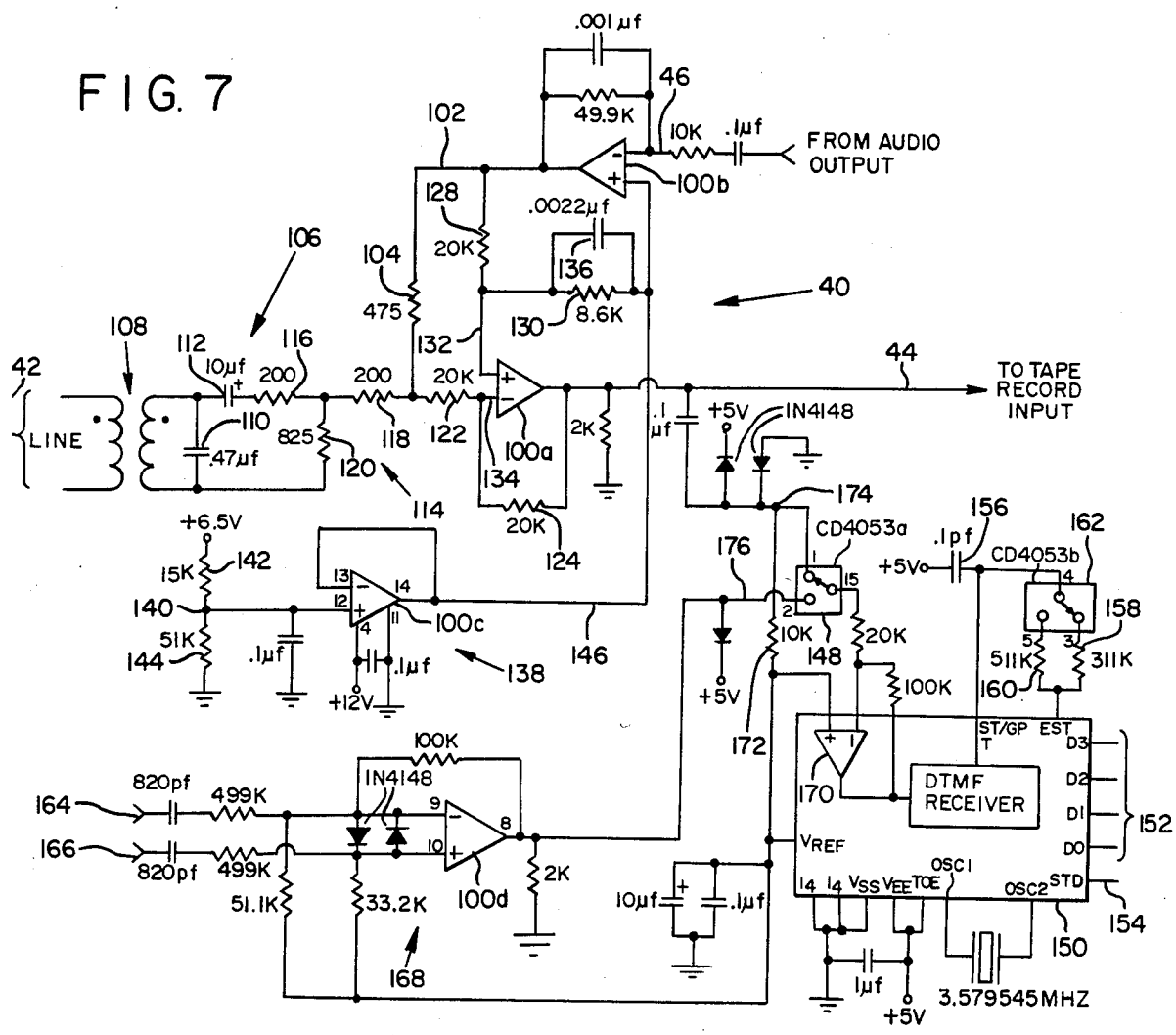
FIG. 7 is an electrical schematic diagram of a two-to-four wire converter and associated circuitry of the system of FIG. 1.

Two-to-four wire converter 40 and associated circuitry are shown in schematic form in FIG. 7. Converter 40 is built around one section 100a of an LM324 quad operational amplifier. System prompt messages and audio from tape playback are routed from line 46 through another section 100b of the LM324 to an output node 102. Operational amplifier 100b has a gain of five to bring the voice prompts and audio playback signals up to a level compatible with other elements of the system. Half of the voltage at circuit node 102 is dropped across a 475 ohm resistor 104. The other half of this voltage is dropped across a transformer network 106.

Transformer network 106 is designed to negate the effect of any impedance mismatch due to deviations in impedance of the telephone line 42. This increases the reliability of the system under varying installation conditions. Transformer network 106 includes a transformer 108, a shunt capacitor 110, a DC blocking capacitor 112, and a T-pad 114. Transformer 108 has a primary winding connected across telephone line 42 and a secondary winding coupled to converter 40. Shunt capacitor 110 serves to optimize the transformer's reflection coefficient. T-pad 114 comprises a pair of 200 ohm series resistors 116, 118 and an 825 ohm shunt resistor 120. T-pad 114 mitigates the effects of any mismatch presented by transformer 108 to 2-to-4 wire converter 40 arising from deviations in the telephone line impedance from its expected 600 ohm value.

Operational amplifier 100a is configured to have an inverting gain of unity. This is accomplished by utilizing resistors 122, 124 of equal magnitudes (20 kilohms). The net gain from circuit node 102 at the output of operational amplifier 100b to a circuit node 44 at the output of operational amplifier 100a is thus −0.5. This gain is set by a one-half voltage divider comprising resistor 104 and transformer network 106, together with the unity inverting gain of operational amplifier 100a.

Operational amplifier 100a is also configured to have a non-inverting gain of two because of the identity of resistors 122 and 124. The input voltage supplied to the non-inverting input of operational amplifier 100a is equal to one-fourth the voltage at circuit node 102 by virtue of the ratio between a 20 kilohm resistor 128 and an 8.6 kilohm resistor 130. Capacitor 136 is connected across resistor 130 to help cancel the loading effects of the telephone network reflected through transformer network 106. This cancellation increases the range of network impedances over which the 2-to-4 wire converter 40 is effective. The net non-inverting gain from circuit node 102 to circuit node 44 is thus 0.5. The resultant signal at the non-inverting input 132 derived from system output signals on line 46 thus substantially cancels that portion of the resulting signal at the inverting input 134 which is derived from system output signals on line 46. Consequently, the voice prompts or other signals at circuit line 46 appear substantially attenuated at line 44 of converter 40.

A biasing circuit 138 provides a five volt, AC ground for 2-to-4 wire converter 40. Biasing circuit 138 is built around a third section 100c of the LM324 and is configured as a voltage-follower. Thus, the five volts at input 140 established by the ratio of 15 kilohm resistor 142 and 51 kilohm resistor 144 also appears at biasing circuit output 146 and bias the converter 40.

Signals from line 44 of converter 40 are coupled through a microprocessor controlled CD4053 switch 148 to the input of a dual tone multifrequency (DTMF) decoder 150. For simplicity, DTMF decoder 150 and related circuitry are not shown in FIG. 3. DTMF decoder 150 is constructed around a Mitel MT8870B integrated circuit. Tones provided to DTMF decoder 150 cause outputs 152 to change in accordance with the detected tone. These outputs are fed through a conventional peripheral interface adapter (not shown) to the system control CPU 22.

Control CPU 22 will not respond to outputs on lines 152 until strobe line 154 validates, or latches, the data. Strobe line 154 will not validate the data until the incoming DTMF tone has been detected for a predetermined period of time. This period is determined by an RC circuit comprised of capacitor 156 and resistors 158 or 160. The selection between resistor 158 and resistor 160 is effected by switch 162, which in turn is controlled by CPU 22. When the voice mail system is recording a message, switch 162 uses resistor 158 in the RC time constant circuit. This causes the decoder to strobe line 154 after the tone has been detected for 30 milliseconds. When the strobe occurs, recording on the tape is terminated. A 30 millisecond burst of the incoming DTMF tone is thus recorded on the tape.

When magnetic tape 34 is being played, switch 162 selects resistor 160 for inclusion in the RC time constant circuit. Resistor 160 causes decoder 150 to strobe after a tone has been received for 40 milliseconds. Any tone sent by a user will thus trigger the decoder. However, tones that were recorded on the magnetic tape and replayed are only 30 milliseconds in length, insufficient to retrigger decoder 150. By this technique, recorded DTMF tones do not trigger decoder 150, whereas live, user-entered tones do.

At times it is desirable that ringing signals from the central office be passed directly to a telephone, such as at a receptionist's desk, and not be intercepted by the voice mail system. In such a "pass-through" mode, the voice mail system should still be able to respond if it is requested to do so. Thus, in the pass-through mode, the tone decoder 150 is still operational and monitors transmissions on the phone line for control signals. For example, during working hours a business may want incoming calls to ring a telephone in a conventional manner. If the person calling wishes to leave a message for someone who is out of the office, the caller or the company receptionist could transmit a DTMF tone causing the voice mail system to activate and take the message. In such case, the voice mail system would hang up on the terminal port (receptionist telephone) and deal directly with the caller on the central office line. If the system is in the pass-through mode and no one answers the ringing phone after a given number of rings, CPU 22 may be programmed to activate automatically and intercept the incoming phone call.

The system is placed in the pass-through mode by toggling a CD4053 switch 148 from the position shown in FIG. 7 in which node 174 is coupled through the switch to tone decoder 150 to a position in which a node 176 is coupled through the switch to the tone decoder. Lines 164 and 166 in FIG. 7 are connected to the tip and ring of the network phone. Amplifier 168, comprised of a fourth section 100d of the LM324, thereby couples the network, or receptionist's, phone line to DTMF receiver 150 when the system is in the pass-through state. Thus, any DTMF tones detected on the network line will control operation of the voice mail system. Switch 148 thus determines whether DTMF detector 150 is connected to the network phone line 164, 166 or 2-to-4 wire converter 40.

DTMF decoder 150 produces a 2.5 volt reference signal which is normally connected to the non-inverting input of its input operational amplifier 170. In the preferred embodiment, this 2.5 volt signal is also applied through a 10 kilohm resistor 172 to input or node 174 of switch 148. A quiescent 2.5 volt signal is always present on input or node 176 of switch 148 due to the biasing of operational amplifier 100d. The application of 2.5 volts to both terminals of switch 148 in this manner prevents a voltage transient from appearing at the inverting input of amplifier 170 of DTMF detector 150 when switch 148 is switched. Such transients might otherwise cause detector 150 to detect the harmonics of a transient generated by this switching.

Referring again to FIG. 3, line 44 is coupled from converter 40 to a switch 52, which is connected to a recording amplifier 54. Amplifier 54 is coupled via a record line 56 to the play/record head and control circuitry 58. Switch 52, which is controlled by microprocessor 24, determines whether play/record head 58 is coupled to the input signal or to a marking oscillator 60. Oscillator 60 produces a frequency tone mark indicating the beginning of a cell.

A play output 62 of play/record head 58 is coupled to a play amplifier 64. Play output 62 is also coupled to a mark detector circuit 66 which detects the presence of a mark at the beginning of a cell. Play amplifier 64 is coupled to a switch 68, which is connected to line 46 through a filter 69. Switch 68 is also coupled to voice synthesizer 32 by a line 70. Switch 68 is controlled by CPU 22 and couples line 46 to voice synthesizer 32 whenever a prompt or system message from the synthesizer is to be transmitted.

Major features of the system can include the ability to leave messages, review messages, check messages status, and add a personal greeting (in addition to the system greeting) for a particular boxholder's mailbox. While reviewing messages, a boxholder has the ability, among other features, to transfer the message to another mailbox, skip to the next message, delete a message, and restart the message. The boxholder indicates the action to be taken by inputting a DTMF code tone signal to the system. The system is able to detect such an input code tone while it is playing a message because the played message is subtracted from input 42 by the 2-to-4 wire converter 40 as previously explained. Thus, although the telephone line 42 has the tone code plus the voice message being played, the subtraction of the output message signal in 2-to-4 wire converter 40 results in substantially only the tone code being provided to the voice mail system on line 44.

Figure 4:
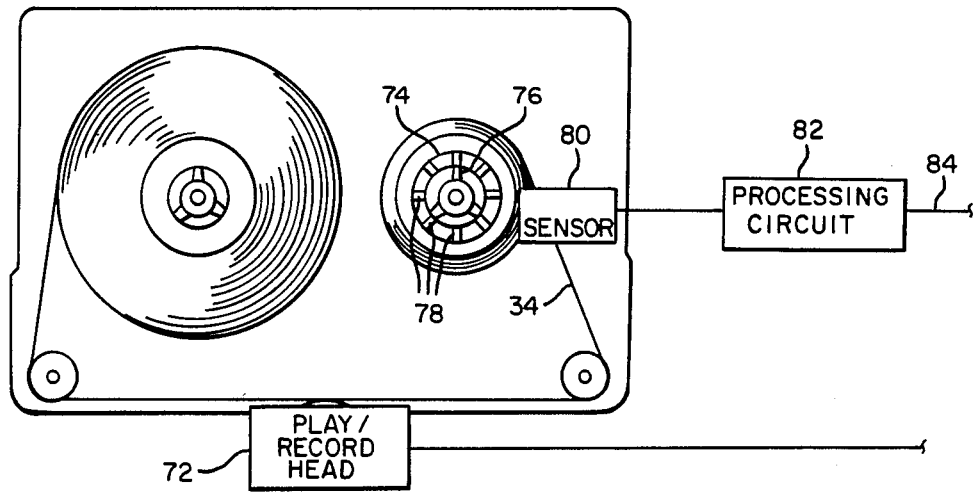
FIG. 4 is a schematic representation of a counting mechanism of the system of FIG. 1.

FIG. 4 illustrates one embodiment of a counting mechanism and transport system 30 suitable for determining the position of tape 34 relative to a play/record head 72. A slotted ring 74 is mounted on a reel axle 76. The ring 74 is provided with eighteen slots. As reel axle 76 turns, an optical sensor 80 detects the passing slots. The output of optical sensor 80 is processed by circuitry 82 to produce a signal output on line 84 with each passing of a slot past sensor 80. Output 84 is fed to microprocessor 24 which counts the output signals. Each such count is referred to herein as a tick. In an alternative embodiment, a magnetic sensor may be used instead of an optical sensor to generate ticks corresponding to tape movement.

The location of a cell on tape 34 is stored in memory 26 as a track number and a cell number. The beginning of a cell 36 is determined by the number of ticks from the center 38 of tape 34 to the start of the cell. The tick count corresponds to the position of play/record head 72 over tape 34. However, because the diameter of a wrap of tape around reel 76 varies, the number of ticks per inch also varies. A conversion formula is applied to the tick count in order to express the beginning of a cell 36 or the length of a cell in terms of ticks.

Figure 5:
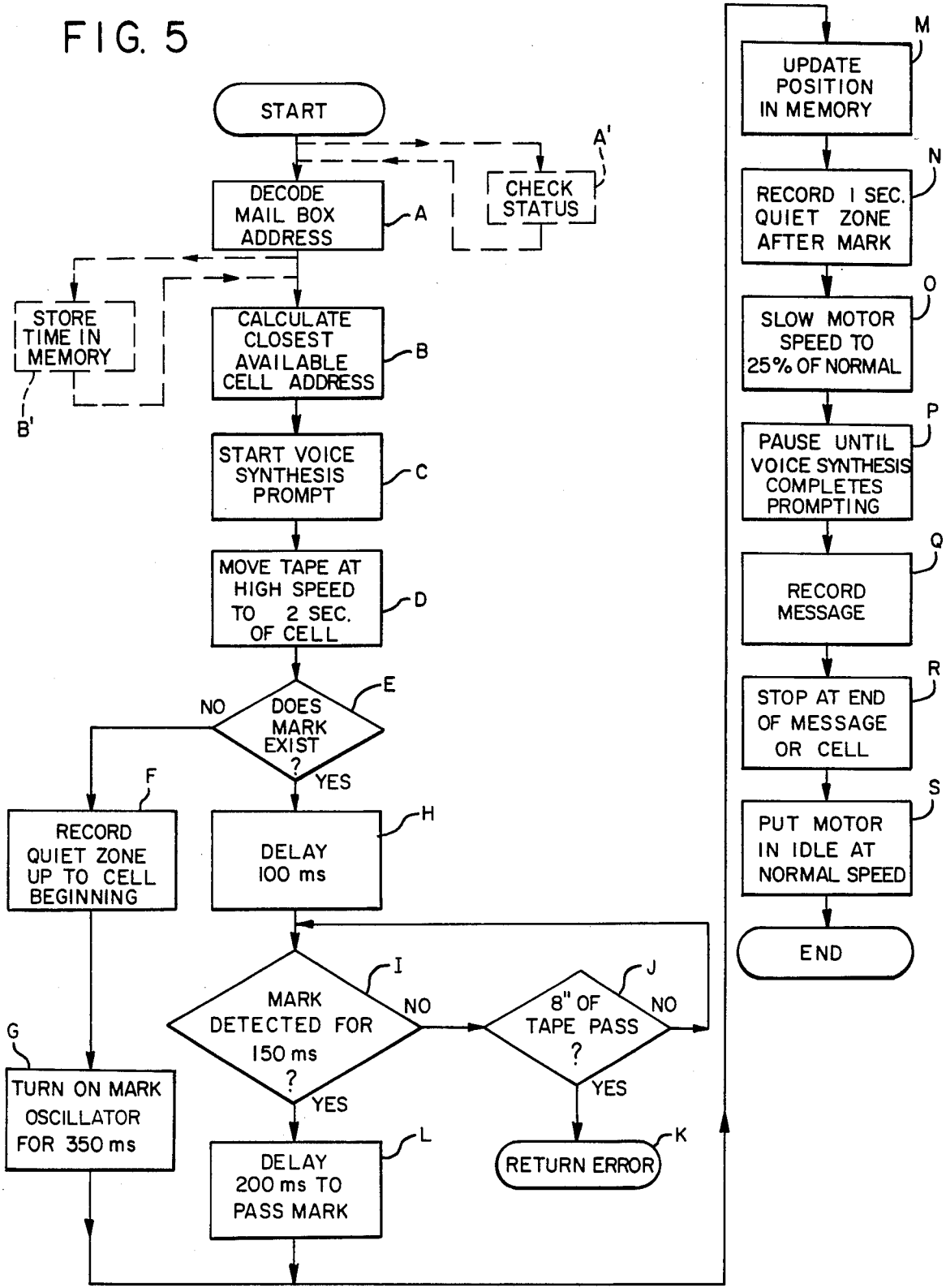
FIG. 5 is a flow chart of the recording method of the system of FIG. 1.
Figure 6:
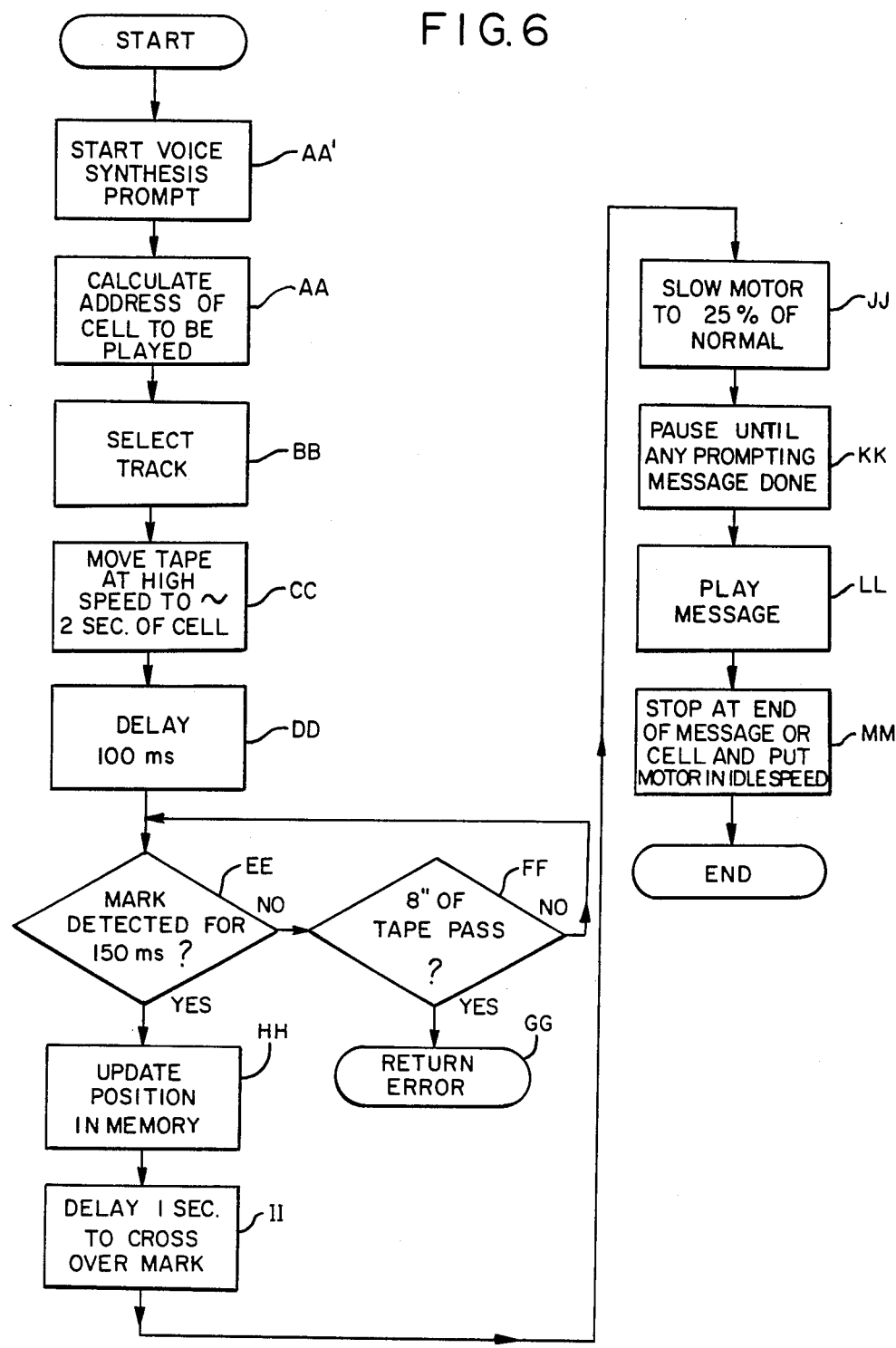
FIG. 6 is a flow chart of the playback method of the system of FIG. 1.

The operation of the present invention is best understood with reference to the flow charts of FIGS. 5 and 6. The FIG. 5 flow chart shows the steps for recording a message on the voice mail system. A user can access the system through local access phone 18 or central office line 12, as shown in FIG. 1. Upon accessing the system, a greeting message of FIG. 2 is transmitted to the user. The system greeting is located on tape 34 (FIG. 4) and is played in the same manner as other messages, as described below in connection with FIG. 6. CPU 22 directs appropriate prompting messages to the user by causing switch 68 (FIG. 3) to connect line 42 via line 46 to line 70, and thus to voice synthesizer 32.

Synthesizer 32 generates an appropriate prompting message.

The record sequence of FIG. 5 commences when the user inputs a DTMF code. If the DTMF code is a feature select code, the system will respond by performing one of a variety of status and checking functions (Box A' FIG. 5). For example, in response to a feature select code, the system can check to determine whether a message the user previously left in a mailbox has been received.

If the input DTMF code is a record access code, the user can leave a message in a mailbox. The user can then input a second DTMF code for the mailbox address to which the message is to be delivered in response to a prompting message. CPU 22 will decode the mailbox address (Step A) and will calculate the track and the number of ticks to the cell closest to the center of the tape (Step B). CPU 22 will then instruct control circuitry 58 such that play/record head 72 is moved to the appropriate track (Step C). The tape is then moved at a high speed on fast-forward or reverse to position the play/record head 72 within approximately 2 seconds, at normal speed, of the available cell (Step D). The position of record head 72 over tape 34 is determined by counting the number of ticks.

CPU 22 then determines whether a mark exists at the beginning of the cell (Step E). If this is the first time that the subject cell has been accessed, no mark will exist. Record control 58 is then put on mute, play/record head 72 is positioned on the tape, and a quiet zone is recorded up to the calculated position of the beginning of the cell (Step F). Mark oscillator 60 is then turned on for 350 milliseconds and during this time is coupled to the play/record control 58 by switch 52 under the control of CPU 22 (Step G). A single frequency, high amplitude 350 milliseconds marking signal is thus recorded at the beginning of the cell. This method eliminates the difficult task of formatting tape 34 prior to operating the voice mail system. Instead, a method is provided for automatically formatting the tape while the system is in normal use.

If, in Step E, CPU 22 determines that the mark already exists, transport 30 will pause for 100 milliseconds to allow play/record head 72 to register against tape 34 (Step H). Mark detector 66 will then be monitored by CPU 22 to determine whether there is an indication of the presence of a mark for at least 100 milliseconds (Step I). If no mark is detected after approximately eight inches of tape (Step J), an error will be indicated and the routine will end (Step K). When a mark is detected, an additional 200 milliseconds will be allowed to pass while motor 30 is running in order to enable the rest of the mark (which should be 350 milliseconds long) to pass play/record head 72 (Step L).

The system's notion of its current position on the tape is then updated by changing the tick count to equal the tick count corresponding to the beginning of the cell in memory 26 (Step M). The actual position on the tape may have varied from the desired position due to slippage or stretching of the tape, or other similar causes. In addition, an error in the tick count could result from dithering, the loss of ticks when starting and stopping transport 30, and different packing densities of tape 34 on counter reel 76. A one-second quiet zone is then recorded after the mark (Step N). Motor 30 is then slowed to twenty-five percent of its normal speed (Step O). Control system 58 is then placed into a pause mode until any prompting messages currently being transmitted by voice synthesizer 32 are completed (Step P). In particular, it is anticipated that a prompting message, indicating to the user that he may now record his message, may still be running.

The message from the user is then recorded (Step Q). At the end of the message or the time allocated to the cell, transport 30 is stopped (Step R). Motor 30 is then put in an idle mode at normal speed (Step S), and CPU 22 awaits further instructions. If the message is continuing as the end of the cell is reached, a prompting message will inquire whether the user desires to continue the message. Upon receipt of an appropriate user response by CPU 22, a standby prompting message will be transmitted to the user and CPU 22 will locate the cell closest to the center of the tape and repeat the recording procedure. The two cells will be linked together in memory 26.

The speed with which motor 30 can arrive at the desired cell is improved because all recording is done at approximately 25% of the normal cassette record speed. This low speed requires a high frequency response tape in order to result in a voice recording of acceptable quality. Lower speeds may be used, but such speeds are limited because of the frequency response characteristics of tape 34 and because of tape wow and flutter.

The routine for playing a recorded message is shown by the flow chart of FIG. 6. A boxholder may receive a "message waiting" signal from the voice mail system, or may call in to check for messages. A system greeting will be played and CPU 22 will direct appropriate prompting messages and respond to inputs from such boxholder. The boxholder will input a DTMF code indicating that he desires to review his messages, and an additional DTMF code which gives his personal mailbox I.D. number. This I.D. number prevents unauthorized access to the system. CPU 22 will determine whether any cells are listed for this particular mailbox. CPU 22 determines, for each such cell, the track and the number of ticks to the location of such cell (Step AA). CPU 22 then instructs control circuitry 58 so that play/record head 72 is moved to the appropriate track (Step BB). Tape 34 is then moved at high speed until play/record head 72 is within approximately two seconds, at normal speed, of the mark (Step CC). Transport 30 then pauses for 100 milliseconds to allow play/record head 72 to register against tape 34 before mark detector 66 is monitored (Step DD). Mark detector 66 is then monitored to determine if a mark is indicated for a period of 150 milliseconds (Step EE). If a mark is not indicated during eight inches of tape (Step FF), CPU 22 indicates an error and ends the routine (Step GG).

Upon detecting a mark, CPU 22 updates the tick count to correspond to the indicated location of the mark in memory 26 (Step HH). Motor 30 then continues for one second to allow sufficient delay in order to pass over the remainder of the mark and into the quiet zone on the other side of the mark (Step II). Motor 30 is then slowed to twenty-five percent of its normal speed (Step JJ). CPU 22 then causes motor 30 to pause until any prompting message from voice synthesizer 32 is completed (Step KK). Of course, if the synthesizer has completed its prompting message, motor 30 will not pause at this time. The message in the cell is then played (Step LL). At the end of the message, motor 30 is put in idle at normal speed (Step MM).

If the message was long enough to span more than one cell, a pointer to another cell address is contained in memory 26. At the end of the first cell, CPU 22 then causes the system to proceed to the successive cell address, and the above process is repeated. During such movement, a message from voice synthesizer 32 indicates that the message will continue momentarily.

The steps shown in FIG. 6 are only representative of one illustrative sequence. In actual operation, certain operations may overlap or happen simultaneously. Also, the software may be designed to anticipate the user's likely next command and begin performing certain background tasks in preparation. Such anticipatory operation can speed the average system response time without degrading it substantially in those cases in which the user does not respond as anticipated.

Figure 8:
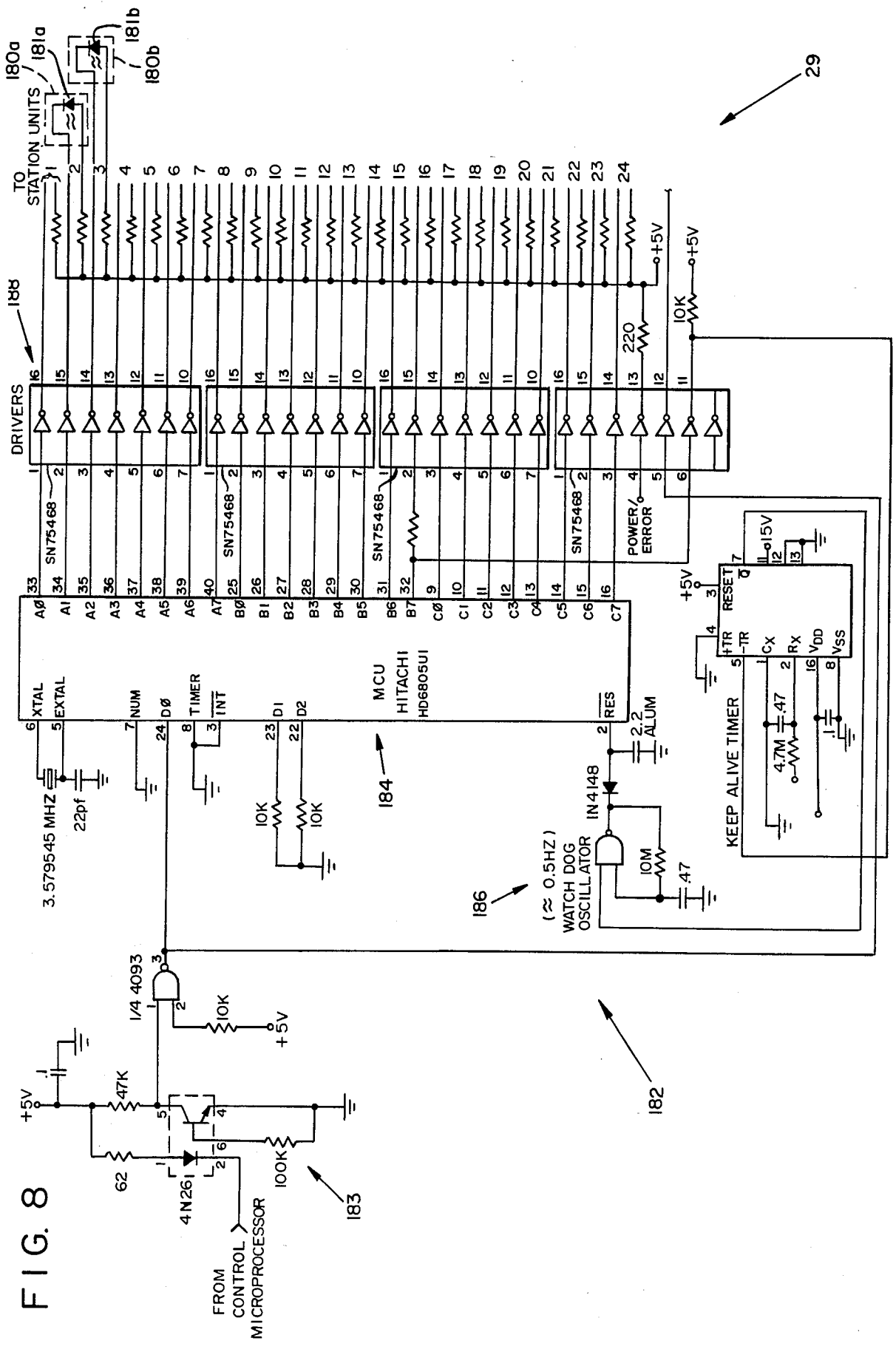
FIG. 8 is an electrical schematic diagram of the message waiting system processor of the system of FIG. 1.

The voice mail system can include a message waiting indicator system 29. With reference to FIG. 8, indicator system 29 in one form comprises plural light emitting diodes, with one such diode being associated with each mailbox holder's telephone set or station. Two such stations 180a, 180b are shown in FIG. 8 with associated light emitting diodes 181a, 181b. A two conductor cable connects each indicator 181a, 181b to a corresponding port of a message waiting processor 182. The illustrated processor has twenty-four such ports and thus can support a twenty-four station message waiting system. The circuit may of course be modified to accomodate more stations if needed.

Processor 182 is coupled to the CPU 22 of the voice mail system by a line receiver 183. The CPU 22 sends data to receiver 183 indicating the status of the system (i.e. whether the system is in use, and therefore busy, or not) and indicating for whom new messages are waiting. Receiver 183 comprises a type 4N26 optoisolator, which serves to condition the received signal for use by a microcomputer unit 184 within processor 182. Receiver 183 may be omitted when message waiting indicator system 29 is connected directly to the host voice mail system, rather than through a lengthy cable. Microcomputer 184 is desirably an 8-bit device which provides twenty-four I/O ports, for connection to the twenty-four different telephone stations. A watchdog timer circuit 186 resets microcomputer 184 approximately once every second in the event the microcomputer fails to refresh its internal timer circuitry due to a software malfunction. Drivers 188 are connected to the I/O ports of microcomputer 184 and are used to drive the message waiting indicators (i.e. 181a, 181b) which are mounted on each system telephone set.

Processor 182 is programmed to send a visual indication to the telephone station when a new message is waiting for the mailbox corresponding to that telephone station. The processor can also be programmed to indicate when the voice mail system is active, or busy, and when the voice mail system is available, or idle. Although multiple indicators can be provided at each station, in the illustrated embodiment a single indicator is used at each telephone station to indicate both whether the voice mail system is available and whether a new message is waiting for the boxholder who has that station. In such a system, the indicator assumes one of four states. In one state, the indicator is constantly off to indicate the voice mail system is idle and available. In a second state, the indicator is constantly on to indicate the voice mail system is busy. In a third state, the indicator is normally off and periodically blinks on to indicate that the voice mail system is available and that a new message is waiting for the boxholder. Finally, in the fourth state, the indicator is normally on and periodically blinks off to indicate that the voice mail system is busy and that a new message is waiting for the boxholder.

The voice mail system described above can have a number of features programmed into it. For instance, a personal code can be required to enable a boxholder to review messages in his mailbox. Such codes can be entered and changed as desired. The system can also allow a boxholder to record a personal mailbox greeting for his or her callers. Upon a user commanding the system to record a message into a boxholder's mailbox, the system would instruct cassette transport system 30 to go to the cell which contains the recorded greeting from that boxholder. The greeting is then played before prompting the user to leave a message. The system can also be programmed to allow such a user to input a code during the playing of the greeting or prompting message to skip the remainder of these messages and proceed directly to recording the user's message. The CPU 22 continuously monitors input 42 for such code commands. As another feature, a user can enter a command to determine whether a message he left earlier in a mailbox has been received.

Distribution lists indicating plural mailboxes may be programmed into the system, with the address of the distribution list being identified as the mailbox address. When a specific distribution list is selected, the cell number(s) containing the message are stored in the mailbox of each mail boxholder on the list. The CPU 22 would then indicate all of the individual mailboxes on such distribution list as having received the applicable message. The distribution lists may be altered as required.

As another feature, a software generated clock can be programmed to store in RAM the date and time that each recorded message was received. This data can later be synthesized into a voice message and sent to the recipient along with the associated message (Step B', FIG. 5).

The present invention will allow any number of other features to be added, limited only by the imagination of the customer. In this manner, the system of the present invention is adaptable to provide a large number of valuable services.

Having illustrated and described the principles of our invention with reference to one preferred embodiment, it should be apparent to those persons skilled in the art that such invention may be modified in arrangement and detail without departing from such principles. We claim as our invention all such modifications as come within the true spirit and scope of the following claims.

We claim:

1. A method for recording audio messages on a magnetic tape in a message system, the audio messages being transmitted from a user over a telephone line, and subsequently forwarding the messages to recipients designated by a mailbox identifier transmitted by the user, comprising:
    switching the system from an idle state to an active state in response to a user generated ringing signal over the telephone line;
    detecting a user generated record access signal, which includes a mailbox identifier for a recipient;
    determining the location of one cell of a plurality of cells on said tape for recording a message in response to said record access signal;
    recording an audio message from said user in said cell;
    storing the location of said cell in association with the mailbox identifier;
    transmitting a message waiting signal to a location remote from said tape for indicating a message is waiting for the recipient;
    switching the system from the active state to the idle state following such recording;
    responding to a recipient generated access signal to allow the recipient to switch the system from the idle state to the active state;
    detecting a recipient generated play access signal which includes the recipient's mailbox identifier to allow the recipient to receive a message associated with the recipient's mailbox identifier;
    determining the location of a cell stored in association with the recipient's mailbox identifier in response to the play access signal;
    transmitting the message recorded in a cell in association with the recipient's mailbox identifier to the recipient; and
    switching the system from the active state to the idle state following such message transmission.

2. The method of claim 1 which further comprises the steps of providing a telephone station for the recipient and transmitting a message waiting signal to the recipient's telephone station after a message is recorded in association with such recipient's mailbox identifier.

3. The method of claim 1 which further comprises the steps of providing a telephone station for the recipient and transmitting a system busy signal to the recipient's telephone station when the system is in the active state.

4. The method of claim 1 which further comprises the steps of providing a telephone station for the recipient and indicating that the system is in an idle state at the recipient's telephone station.

5. The method of claim 1 which further comprises the steps of providing a telephone station for the recipient and transmitting a system busy and message waiting signal to the recipient's telephone station when the system is in the active state and when the system has a new message recorded in association with the recipient's mailbox identifier.

6. The method of claim 1 which further comprises the steps of transmitting outgoing prompting messages to the user and to the recipient on a message line.

7. The method of claim 6 which further comprises subtracting the outgoing prompting messages and the transmitted messages from incoming messages on the message line such that the prompting messages and transmitted messages are substantially cancelled from the incoming messages, whereby an incoming message from the user or recipient can be received on the message line without significant interference from the prompting or transmitted message.

8. The method of claim 7 which further comprises compensating for differences in the telephone line impedance from an expected value.

9. The method of claim 1 which further comprises the step of recording the time and data at which an audio message is recorded.

10. The method of claim 1 which further comprises:
    detecting the duration of a user entered tone signal command; and
    executing the command in response to the detection of the command signal for a first time period.

11. The method of claim 10 which further comprises recording the command signal on the magnetic tape for a second time period shorter than the first time period, whereby the system will not reexecute the command upon playing back of the recorded command signal because the recorded command signal is shorter than the first time period.

12. The method of claim 1 in which the switching system step comprises:
   detecting a user generated feature select signal;
   responding to the feature select signal; and
   switching the system from the active state to the idle state following such response.

13. The method of claim 1 which further comprises:
   detecting a user generated check status command;
   checking whether a message left in the system has been received by the recipient; and
   indicating to the user whether said message has been received by the recipient.

14. A voice mail system for recording audio messages transmitted by a user over a telephone line to the system and for subsequently forwarding the messages to recipients designated by mailbox identifiers transmitted by the user, comprising:
   a magnetic tape divided into a plurality of message cells;
   means, coupled to said telephone line, for recognizing an incoming call and placing the system in an active state;
   decoder means coupled to said telephone line for decoding control signals including mailbox identifiers transmitted on said telephone line;
   processing means coupled to said decoder means for controlling the operation of said voice mail system;
   message recording means, controlled by said processing means and coupled to said telephone line, for recording audio messages in said message cells;
   memory means, controlled by said processing means, for storing cell locations in which messages have been recorded and mailbox identifiers associated with the stored cell locations;
   means for switching the system to an idle state after an audio message has been recorded and after the memory means has stored the cell location and mailbox identifier;
   indicator means located at a location remote from the message recording means, controlled by said processing means, for indicating the presence of a new recorded audio message in the system in association with a recipient's mailbox identifier;
   means for the recipient to switch the system to an active state;
   playback means, controlled by said processing means and coupled to said telephone line, for playing a message recorded in a cell in response to a recipient's generated control signal which includes the mailbox identifier associated with the recorded message; and
   means for returning the system to the idle state following the playback of a message.

15. The system of claim 14, in which the indicator means comprises means for indicating whether the system is in an active or an idle state.

16. The system of claim 14, further comprising:
   prompting means coupled to the telephone line for providing outgoing prompting signals over the telephone line to the user and the recipient; and
   two-to-four wire converter means for splitting the telephone line into a first incoming data line coupled to the decoder means and a second outgoing data line coupled to the prompting means, said converter means including means for subtracting outgoing signals on said telephone line from the second data line from incoming signals delivered to said first data line.

17. The system of claim 16 including means for compensating for differences in telephone line impedance from an expected value, whereby said means for subtracting provides substantial cancellation of the outgoing signals from the incoming signals.

18. The method of claim 14 which further comprises means for automatically storing the time and date at which an audio message is recorded in the system.

19. The system of claim 14 in which the processing means comprises means for executing commands in response to Touch-Tone command signals of a first time period, the recording means comprises means for recording the Touch-Tone command signals for a second time period shorter than said first time period, whereby the processing means will not execute the recorded commands when they are played back because the duration of the played back commands is less than the first time period.

20. In a voice mail system for connection to a telephone line, the system including a decoder coupled to the telephone line for decoding incoming dual tone multiple frequency command signals and including a prompting device coupled to the telephone line for transmitting outgoing audio voice prompt signals, means for preventing the outgoing prompt signals from interfering with the decoding of said incoming command signals, said means comprising:
   transformer means having a first and a second side, the first side being coupled to the telephone line;
   first voltage divider means having an input connected to the output of the prompting device and an output connected to the second side of the transformer for producing at the second side of the transformer a voltage corresponding to approximately one-half the voltage output from the prompting device;
   amplifier means having an inverting input, a non-inverting input, and an output, the inverting input being coupled to the second side of the transformer and the output being coupled to an input of the decoder, for providing to the decoder a net signal voltage equal to two times a voltage applied to the non-inverting input minus a voltage applied to the inverting input by the second side of the transformer; and
   second voltage divider means having an input connected to the output of the prompting device and an output coupled to the non-inverting input of the amplifier means, for producing at the non-inverting input of the amplifier means a voltage equal to one-fourth a voltage output from the prompting device, whereby the amplifier means provides to the decoder a net signal devoid of voice prompt signals.

21. The system of claim 20 in which the decoder is switchable between one of a plurality of inputs and which further includes means for providing equal quiescent bias voltages to all of said plurality of inputs so as to minimize transients generated by switching between the inputs.

22. The method of claim 1 wherein said step of transmitting the message comprises:
   moving the tape at a first speed until a play head adjacent the magnetic tape is at a position proximate and prior to a marking signal on the tape for such cell;

moving the tape at a second speed until said marking signal is detected; and playing the message in said cell.

23. The method of claim 22 wherein said step of moving the tape at a first speed includes:
  providing a slotted ring coupled to a reel of said tape;
  producing a signal in a transducer mounted proximate said slotted ring each time a slot of said ring passes said transducer;
  counting said signal; and
  terminating movement of the tape at the first speed when the signal count corresponds to a position proximate and prior to said cell.

24. The method of claim 1 which further comprises repeating the first-mentioned detecting step, the first-mentioned determining step and the recording step for a second cell when the message will not fit in the first-mentioned cell.

25. The method of claim 24 further comprising:
  transmitting a first prompting message to said user when a record head is proximate an end of said first cell; and
  transmitting a second prompting message to said user when the record head is proximate a beginning of said second cell.

* * * * *